W. H. DAY.
MACHINE FOR MOLDING TABLETS OF COMPRESSED FOOD AND THE LIKE.
APPLICATION FILED JAN. 4, 1919.

1,341,226.

Patented May 25, 1920.
2 SHEETS—SHEET 1.

INVENTOR.
William Harper Day.
per Arthur J. Stephens
Attorney.

W. H. DAY.
MACHINE FOR MOLDING TABLETS OF COMPRESSED FOOD AND THE LIKE.
APPLICATION FILED JAN. 4, 1919.
1,341,226.
Patented May 25, 1920.
2 SHEETS—SHEET 2.
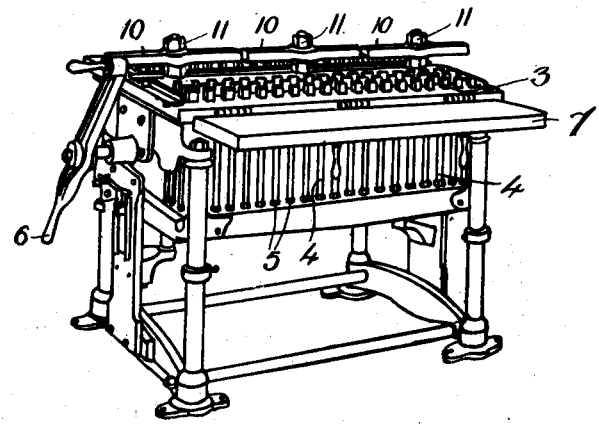
Fig:3.
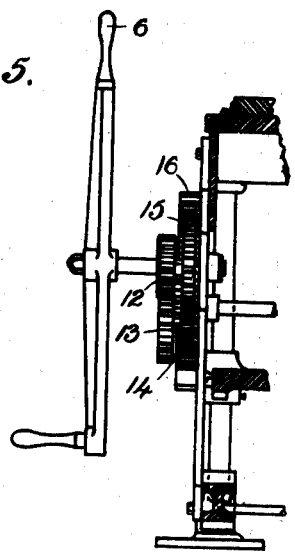
Fig:5.
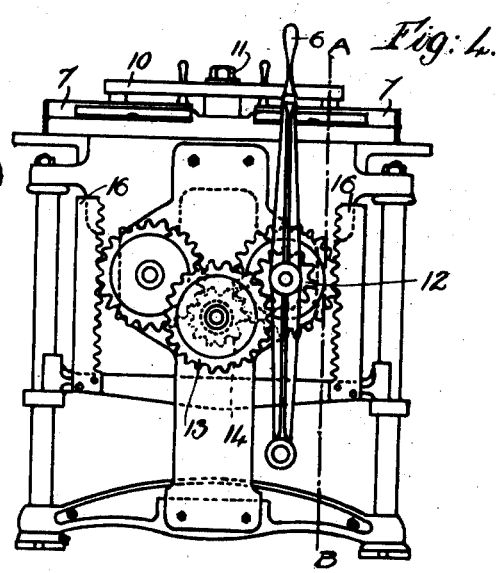
Fig:4.
INVENTOR.
William Harper Day.
per Austin J. Stephens
Attorney.

UNITED STATES PATENT OFFICE.

WILLIAM H. DAY, OF HOUNSLOW, LONDON, ENGLAND.

MACHINE FOR MOLDING TABLETS OF COMPRESSED FOOD AND THE LIKE.

1,341,226.  Specification of Letters Patent.  Patented May 25, 1920.

Application filed January 4, 1919. Serial No. 269,593.

*To all whom it may concern:*

Be it known that I, WILLIAM HARPER DAY, a subject of the King of Great Britain and Ireland, residing at The Novelty Works, Ivy Road, Hounslow, in the county of London, England, have invented new and useful Improvements in Machines for Molding Tablets of Compressed Food and the like, of which the following is a specification.

The present invention relates to improvements in machines for molding tablets of compressed food and other articles.

The present invention is designed to provide a machine which will mold large numbers of such tablets simultaneously.

Broadly contemplated the present invention comprises a tank mounted on a suitable framework and provided with a receiving trough for the material to be compressed, combined with a mold plate which forms the bottom of the trough. This mold plate carries a series of molds arranged over a piston head carrying a corresponding series of pistons adapted to register with the molds. The piston head may be stationary and the tank and molds adapted to be moved relatively thereto, or alternatively the tank and molds may be stationary and the piston head and its pistons movable relatively to the tank and molds. The mouths of the molds are covered by a compression plate and the tablets are molded between the compression surface of said plate and the compression faces of the pistons.

My invention is illustrated by way of example in the accompanying drawings applied to a molding machine in which the tank and molds are stationary and the piston head and pistons are movable relatively to the tank and molds, in which—

Fig. 3 shows a perspective view of the machine with the compression plates turned back and a series of soup squares raised above the mold plate;

Fig. 4 shows a front view of an alternative form of lifting gearing, and

Fig. 5 shows a broken view in vertical section on the line A—B of Fig. 4.

Figure 1:
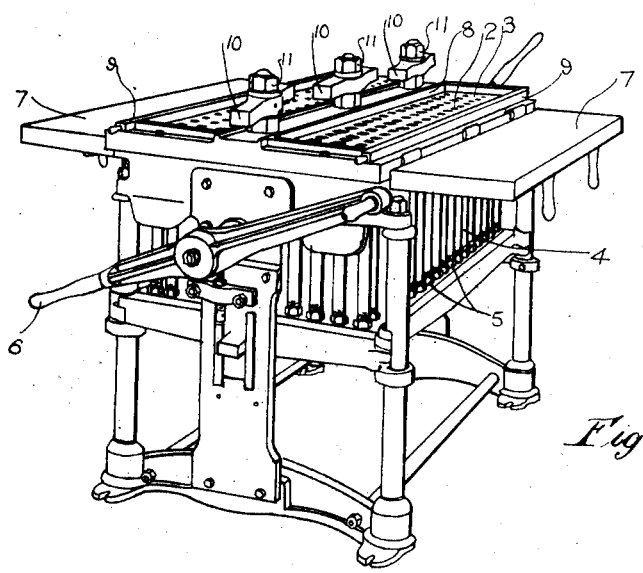
Figure 1 shows a perspective view of a duplex molding machine with the compression plates turned back from the mold plate.

Referring now to the drawings, the tank 1 is provided with a series of molds the mouths 2 of which extend through the mold plate 3 as shown more particularly in Fig. 1 of the drawings.

In the drawings I illustrate by way of example square molds for manufacturing soup squares as shown in Fig. 3. It should be understood, however, that the shape of the molds and their corresponding pistons are of course dependent upon the form of the tablet it is desired to manufacture in the machine. Further, it may sometimes be desired to manufacture soup squares and the like with fancy shapes at each end and to mold such formations the compression faces of the compression plate and pistons must be given the desired shape. For instance, to manufacture soup squares with a round top and bottom I may recess the compression face of each piston while on the inner surface of the top plates which cover the molds I arrange a number of disks adapted to register with the mouths of the molds when the plates are in position and provided with recesses on the compression surfaces corresponding with the recesses on the compression surfaces of the pistons. The pistons which are not shown in the drawings are carried by the piston rods 4 mounted upon the piston head 5, the latter being adapted to be raised or lowered through a suitable gearing by the hand lever 6. The compression plates can suitably be formed as shown in the drawings by a pair of hinged top plates 7 arranged over the mold plate 3 in the bottom of the trough 8 and adapted to be turned over to cover the mouths 2 of the molds before the molding operation.

Figure 2:
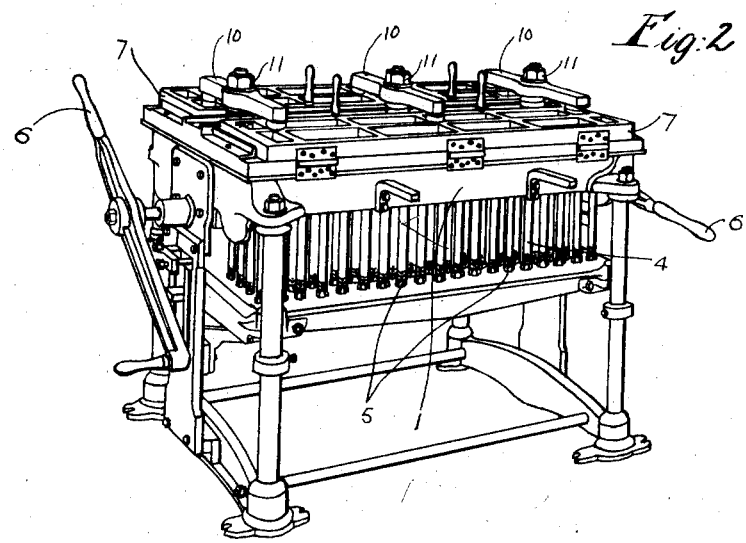
Fig. 2 shows a perspective view of the machine with the compression plates locked in position over the mold plate.

In the machine shown in the drawings the sides 9 of the troughs 8 are removable to allow of the top plates 7 being turned down upon the surface of the mold plates 3 as shown in Fig. 2. Means must be provided for locking the top plates in position and for this purpose I may provide as shown in the drawings three pivotally mounted resistance bars 10. These bars are adapted to be swung from a central position clear of the top plates to a position over the top plates as shown in Fig. 2 and fastened in this position by means of the nuts 11 to hold the said top plates 7 securely during the molding operation.

Any suitable source of power can be employed to operate the machine. In the drawings I illustrate a hand operated machine adapted to raise or lower the piston head 5 and consequently the piston rods 4. This lever mechanism may be provided with a suitable counterweight or counterweights to facilitate the molding operation and to enable the use in one machine of many hundreds of molds and the consequent simultaneous production of corresponding numbers of tablets.

In Figs. 4 and 5 I illustrate a suitable gearing for operating a duplex machine such as the machine shown. The hand lever 6 is adapted to turn a pinion 12 in engagement with a central gear wheel 13 which gear wheel is in one with a pinion 14 in mesh with the rack wheels 15 in engagement with the racks 16 connected with the piston head 5. By this gearing the piston head 5 is evenly raised or lowered with the minimum of effort.

The walls of the molds inside the tank can, if desired, be reinforced with concrete.

In use, the material to be compressed is poured into the tank 8 and passes from thence into the molds. The hinged top plates 7 are then turned down over the mouths 2 of the molds and are then locked in position. If the tank 1 is stationary as shown the material in the molds is compressed by raising the piston head 5 with its pistons or plungers against the top or compression plates. If the tank is movable it is lowered against the stationary piston head, thereby compressing the material in the molds between the compression surfaces of the pistons and the top plates.

It will be readily understood that by varying the length of the molds and/or the length of movement of the tank or the piston head, whichever is movable, both the weight and the length of the article produced can be varied at the will of the operator.

What I claim is:

1. A machine for molding tablets of compressed food and other articles comprising a receiving trough for the material to be compressed, a mold plate forming the bottom of said receiving trough, a series of molds mounted in said mold plate, a piston head, a series of pistons mounted on said piston head adapted to register with said molds, and a compression plate in the form of a pair of plates hinged to the top of the machine and adapted to cover the mouths of the molds in the bottom of the trough during the operation of molding the tablets of compressed food between the compression surface of said plate and the compression faces of the pistons.

2. A machine for molding tablets of compressed food and other articles comprising a receiving trough for the material to be compressed, a mold plate forming the bottom of said receiving trough, a series of molds mounted in said mold plate, a piston head, a series of pistons mounted on said piston head adapted to register with said molds, a compression plate in the form of a pair of plates hinged to the top of the machine, a pair of side bars adapted to form the sides of the trough and capable of being removed to allow of the top plates being turned down upon the surface of the mold plate to cover the mouths of the molds during the operation of molding the tablets of compressed food between the compression surface of said plates and the compression faces of the pistons.

3. A machine for molding tablets of compressed food and other articles comprising a receiving trough for the material to be compressed, a mold plate forming the bottom of said receiving trough, a series of molds mounted in said mold plate, a piston head, a series of pistons mounted on said piston head and adapted to register with said molds, a compression plate in the form of a pair of plates hinged to the top of the machine, a pair of side bars adapted to form the sides of the trough and capable of being removed to allow of the top plates being turned down upon the surface of the mold plate to cover the mouths of the molds during the operation of molding the tablets of compressed food between the compression surface of said plates and the compression faces of the pistons, a plurality of resistance bars adapted to be moved from a position in the center of the machine clear of said top plates to a position in which they are over said top plates and means for fastening said resistance bars in position over said top plates.

4. A machine for molding tablets of compressed food and other articles comprising a receiving trough for the material to be compressed, a mold plate forming the bottom of said receiving trough, a series of molds mounted in said mold plate, a piston head, a series of pistons mounted on said piston head and adapted to register with said molds, a compression plate in the form of a pair of plates hinged to the top of the machine, a pair of side bars adapted to form the sides of the trough and capable of being removed to allow of the top plates being turned down upon the surface of the mold plate to cover the mouths of the molds during the operation of molding the tablets of compressed food between the compression surface of said plates and the compression faces of the pistons, a plurality of resistance bars adapted to be moved from a position in the center of the machine clear of said top plates to a position in which they are over said top plates, means for fastening said resistance bars in position over said top plates, a hand lever, a pinion turned by said hand lever, a central gear wheel in engagement with said pinion, and a pinion in one with said gear wheel adapted to engage a pair of racks carrying the piston head.

In testimony whereof I sign my name to this specification.

WILLIAM H. DAY.